United States Patent [19]
Hundley

[11] 3,947,665
[45] Mar. 30, 1976

[54] CONTROL SYSTEM AND METHOD
[75] Inventor: R. Gerald Hundley, Duxbury, Mass.
[73] Assignee: VSI Energy Systems International, Inc., Philadelphia, Pa.
[22] Filed: Apr. 22, 1974
[21] Appl. No.: 462,654

[52] U.S. Cl......... 235/150.1; 340/147 R; 340/324 A
[51] Int. Cl.[2]...................... G06F 3/04; G06F 15/46
[58] Field of Search............. 235/151.1, 151, 150.1; 340/172.5, 152 R, 147 P, 324 A

[56] References Cited
UNITED STATES PATENTS

| | | | |
|---|---|---|---|
| 3,387,282 | 6/1968 | Jacques | 235/151.1 |
| 3,474,438 | 10/1969 | Lauher | 340/324 A |
| 3,582,621 | 6/1971 | Lawler | 235/151.1 |
| 3,613,419 | 10/1971 | Silva | 72/8 |
| 3,622,992 | 11/1971 | Schoenwitz | 340/151 X |
| 3,701,945 | 10/1972 | Gallant et al. | 340/324 A |
| 3,750,134 | 7/1973 | Weisend | 340/324 A |

*Primary Examiner*—Eugene G. Botz
*Attorney, Agent, or Firm*—Melvin R. Stidham

[57] ABSTRACT

A console with a keyboard and visual display means is employed for setting or adjusting various controller circuit parameters such as control mode adjustments of the gain, integral and derivative times, set point, dead zone, high and low limit control and alarms, and the like, depending upon which such circuits are included in the controller. The parameters so set may be displayed by use of the display means under control of the keyboard. In addition, other circuit operating conditions such as the values of the process signal, error or deviation signal, manipulated variable or output signal, and the like, may be displayed by the display means under keyboard control. Furthermore manual controller operation under keyboard control also is provided.

31 Claims, 7 Drawing Figures

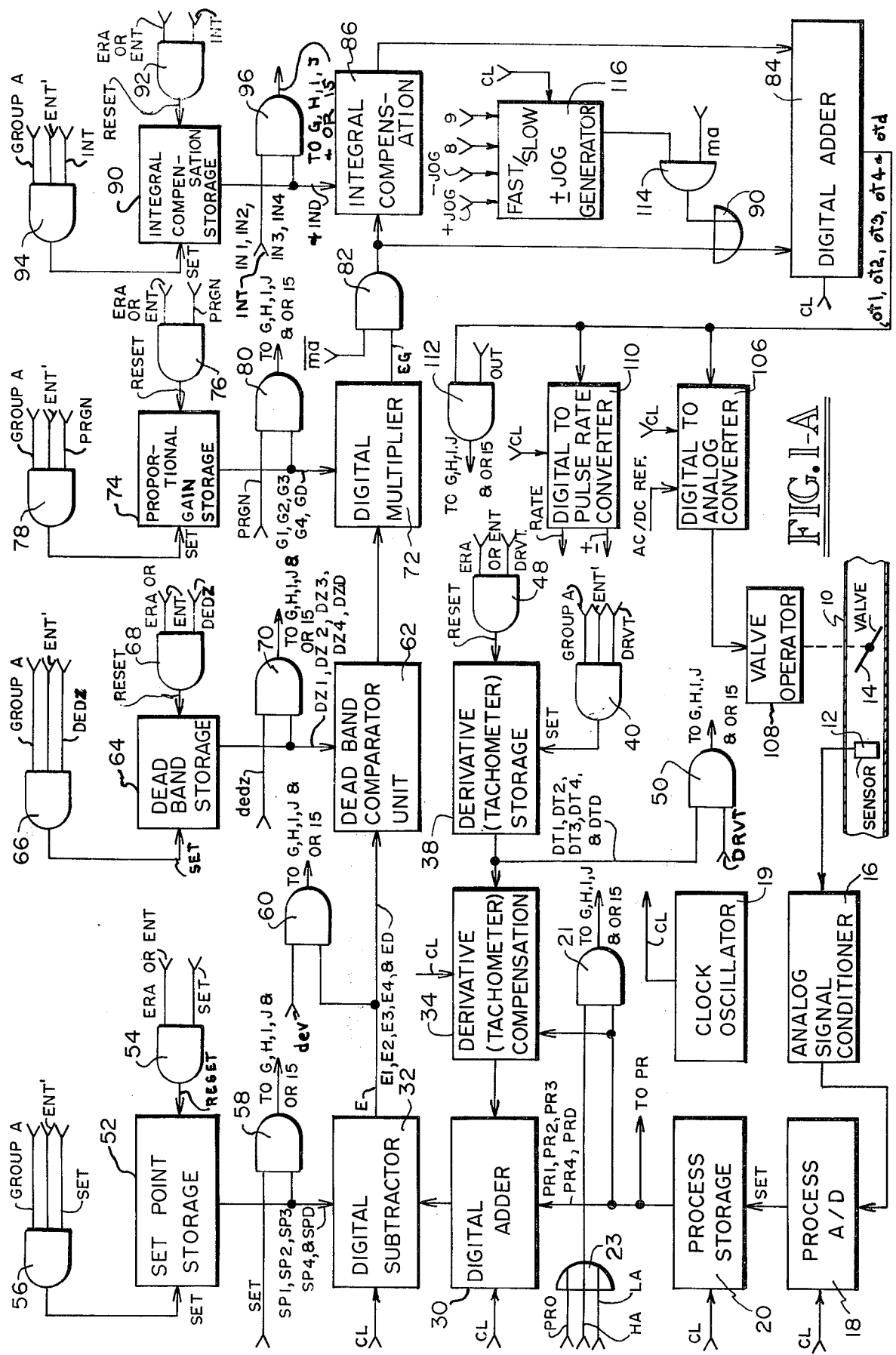
FIG.1-A

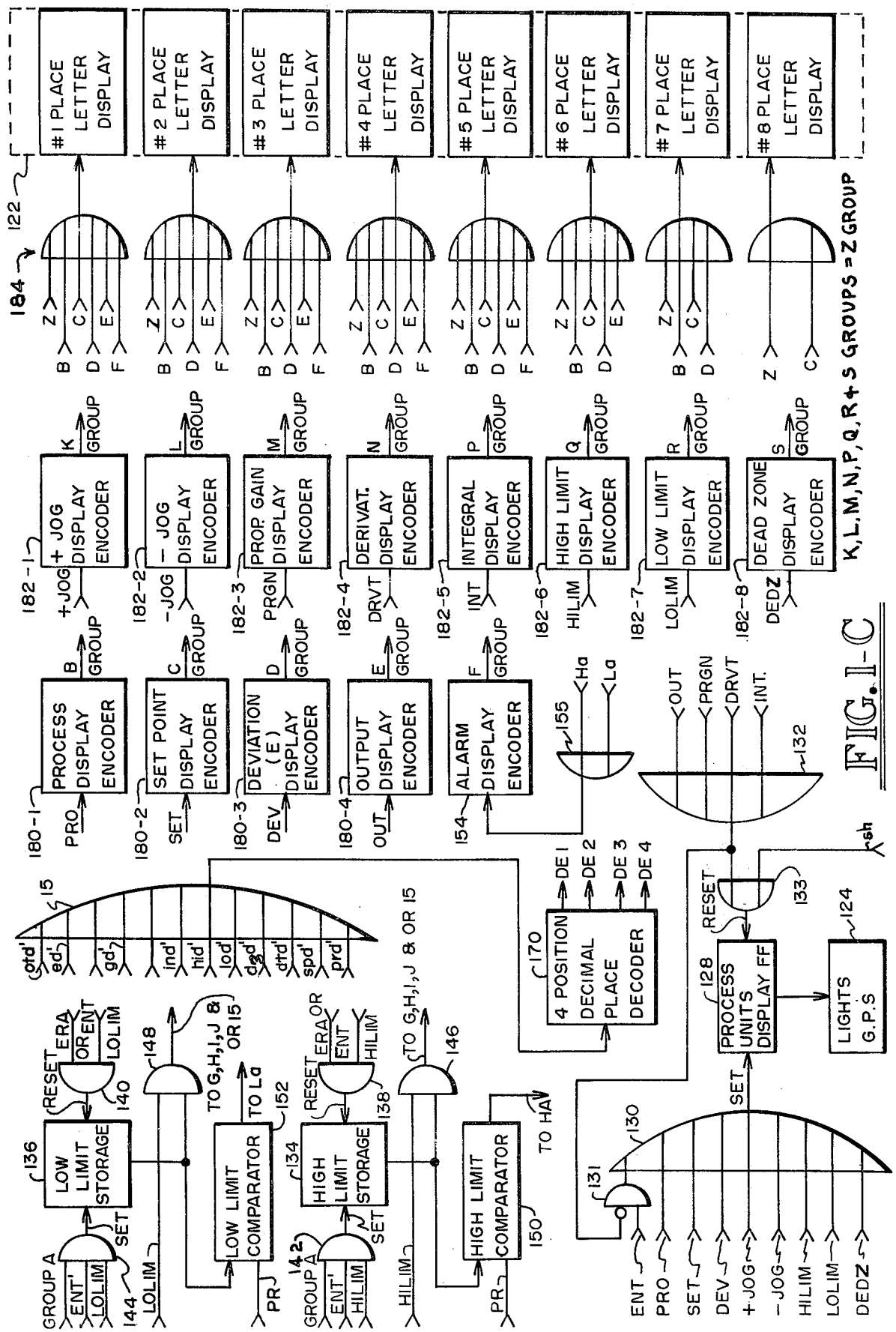

CONTROL SYSTEM AND METHOD

BACKGROUND OF THE INVENTION

Controllers, including indicating controllers, are widely used in process control systems to control one or more process variables such as pressure, flow, temperature, liquid level, or the like. In a typical system the controlled variable is measured and the measured value is fed back for comparison with a reference input $sp$ comprising the desired value of the controlled variable. An error signal, E, comprising the difference between the reference input sp (or set point) and measured value of the controlled variable, is supplied as an input to controlling circuits such as dead zone comparators, proportional gain amplifiers or multipliers, integral and derivative compensation circuits, and the like, for the desired controller action. A three mode controller employs the three proportional, integral and derivative control actions. The output (i.e. manipulated variable) from the controlling circuit or circuits is supplied to the controlled system to maintain the controlled variable at the set point. Digital, analog or a combination of digital and analog circuitry may be employed.

Prior art controllers often include one or more analog meters at the front panel thereof for display of one or more controlled values such as the measured value of the controlled variable and the error signal. A dial for setting and indicating the set point also is included at the panel. Various other control knobs for mode adjustment are included, which often are located behind the front panel to reduce the already cluttered appearance of the front panel. Generally, no display of the mode adjustments other than the physical positioning of the knobs with respect to their associated dials is provided. Actual values of many directly adjustable and non-adjustable controller circuit parameters can be checked only by use of suitable test instruments.

OBJECTS OF THE INVENTION

An object of this invention is the provision of a controller system and method which overcome the above-described shortcomings and disadvantages of the prior art arrangements.

A futher object of this invention is the provision of a controller whereby actual values of many different controller circuit parameters and operating conditions at different circuit points may be displayed at the controller panel or console.

A further object of this invention is the provision of a controller of the aforementioned type in which the parameter or condition to be displayed is readily selected by selector means at the front of the control panel.

A further object of this invention is the provision of a controller of the aforementioned type including a second display to identify the parameter or condition selected to be indicated.

A further object of this invention is the provision of a controller which, when operated in a manual, open-loop, mode provides a visual display of a measure of the manipulated variable which is supplied to the controlled system to facilitate manual setting thereof.

SUMMARY OF THE INVENTION

The above and other objects and advantages are achieved by a controller which may have proportional, integral and derivative actions. A plurality of storage units are included which contain information such as set point, proportional gain, integral and derivative time constants. A console having indicator means and a keyboard is provided for such uses as entering information into said storage units, displaying the amount to be entered and the amount entered in an identified storage unit, and displaying circuit conditions at selected circuit locations such as the manipulated variable, or output, error signal, or the like, while displaying an identification of such circuit location. Counters and registers under control of the keyboard are used in the selection of circuits and the temporary storage of information to be entered into said storage unit.

The novel features which are believed to be characteristic of the invention are set forth with particularity in the appended claims. The invention itself, however, both as to its organization and method of operation, together with further objects and advantages may best be understood by reference to the following description taken in connection with the accompanying drawings.

BRIEF DESCRIPTION OF THE DRAWINGS

In the drawings, wherein like reference characters refer to the same parts in the several views:

FIGS. 1A, 1B, and 1C, together, comprise a block diagram showing one form of controller embodying this invention used for fluid flow control;

DESCRIPTION OF A PREFERRED EMBODIMENT

Figure 1B:
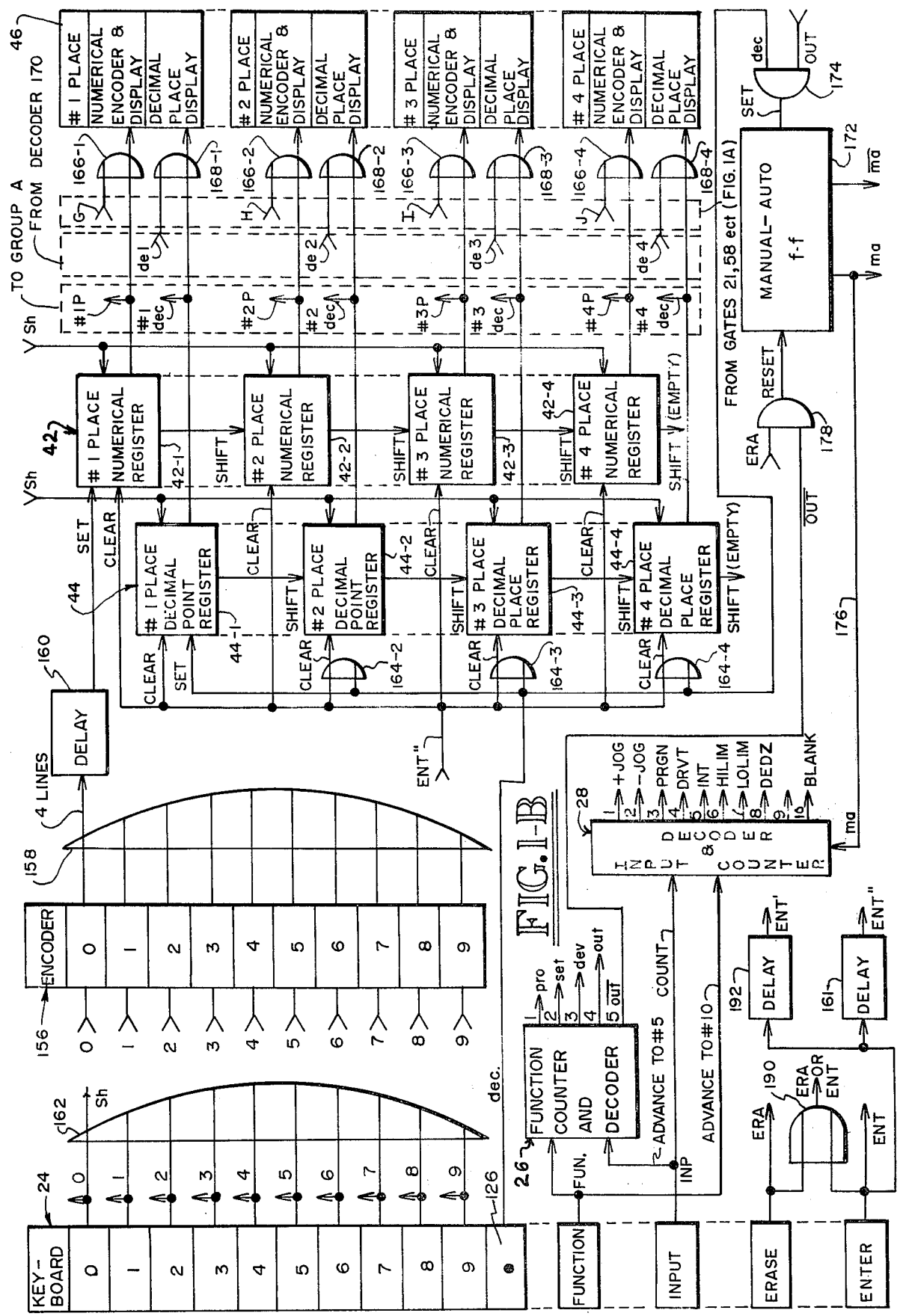

Reference first is made to FIG. 1A wherein there is shown, for purposes of illustration, a three mode controller having proportional, integral and derivative controller action, in addition to a manual operating mode. In the illustrated arrangement the controller is used for the automatic control of fluid flow within a pipe 10. Obviously, use of the controller for control of other process variables is contemplated.

Sensing means 12 are located in the pipe 10 downstream of the flow control valve 14 to provide a measure of the controlled variable which, in the illustrated arrangement, is an analog rate of flow signal. Such flow sensing means are well known in the art and require no detailed description.

The analog process signal from the sensing means 12 is applied to a signal conditioning unit 16 for setting of zero levels and ranges compatible with the controller input circuitry. Typically, the analog signal conditioner 16 comprises an operational amplifier with a differential input circuit and having a high common mode rejection. As noted above in the background of the invention analog, digital and a combination of analog and digital controller circuits are well known. In the illustrated embodiment, wherein digital controller circuitry is employed, the modified analog process signal from the conditioning unit 16 is converted to digital form by an analog to digital (A/D) converter 18. The exemplary A/D converter has four binary coded decimal (BCD) digit outputs provided over 16 lines, and decimal place information provided over two lines for locating the decimal point before any of the four digits.

The digital process signal from the A/D converter 18 is supplied to a Read/Write process storage unit 20 comprising, for example, a plurality of magnetic cores or flip-flops each of which have two stable states. Preferably, but not necessarily, the unit 20 comprises non-volatile storage means such as a magnetic core array. The magnetic cores function as flip-flops which are set by application thereto of the BCD signals from the A/D converter 18, and are re-set (demagnetized) by application of clock signals cl from clock oscillator 19. The process storage unit 20 provides a temporary binary storage for the digital output signal from the A/D converter 18, the contents of which storage unit is periodically updated to store the measure of the process from sensor unit 12. The storage unit is periodically cleared, set and read out under control of the clock signal *cl*.

The four digit process signal with decimal place information is identified as *pr*1, *pr*2, *pr*3, *pr*4 and *prd* at the output from the process storage unit 20. The process signal may be manifested at a visual display means 46 (FIG. 1B) through 18 AND gates 21 when the gates are conditioned to pass signals upon energization of the other input lead thereto from an OR gate 23. The OR gate 23 may be supplied with process (pro), high alarm (*ha*) or low alarm (*la*) input signals in the presence of any one of which signals the OR gate 23 transfers an enable signal to each of the 18 AND gates 21. A keyboard 24, shown in FIG. 1B, and associated circuitry including function and input counters and decoders 26 and 28, respectively, supply many of the control signals employed in the operation of the controller described below.

The process signal from the process storage unit 20 is supplied through a digital adder 30 to a digital subtractor 32. In the exemplary arrangement, a derivative operation is performed directly on the process signal by a derivative compensation circuit 34 having an output which is added to the process signal at the digital adder. Digital derivative action may be effected by use of a suitable derivative, or tachometer, circuit which effectively takes the difference of two successive discrete inputs at times $t_1$ and $t_1 + \Delta t$ and divides by $\Delta t$, a fixed value. The rate signal from the unit 34, which is added to the process signal from process and storage unit 20, provides for stability of controller operation, particularly where the process signal is operable over a broad range.

A derivative storage unit 38 associated with the derivative compensation unit 34 establishes or sets the value of the derivative constant of the unit 34. The storage 38 preferably, but not necessarily, comprises an array of magnetic cores, or similar non-volatile storage means, which function as flip-flops supplied with the desired derivative constant, $K_D$ information. The cores are set by A group signals supplied thereto through AND gates 40 in the presence of enter' (ent') and derivative tach (drvt) signals at the AND gate inputs. A reset signal from an AND gate 48 to demagnetize the magnetic cores of the derivative storage unit 38 is provided upon simultaneous application of erase (era) or enter (ent) and drvt signals to the gate. A suitable derivative compensation unit 34 which may be employed in the controller is shown in additional detail in FIG. 3 described below.

As will become apparent hereinbelow the A group signals are obtained from numerical and decimal point registers 42 and 44, respectively, in which numerical and decimal point information is entered through operation of the keyboard 24 (FIG. 1B). The ent and drvt signals are derived from the keyboard 24 and input counter and decoder 28, respectively. It will here be noted that the keyboard 24 and associated registers 42 and 44 are used to supply A group signals to other storage units under control of the input counter and decoder 28. In the exemplary arrangement the A group signals from the registers 42 and 44 comprise four BCD digit outputs over 16 lines and decimal place information over two lines, for a total of 18 lines. The block 40 (FIG. 1A) therefore represents 18 AND gates to which the 18 individual digit and decimal place lines are connected. All of the AND gates 40 have drvt and ent' input lines thereto which must be energized in order to enter the A group information into the storage unit 38. Also, the contents of the registers 42 and 44 are displayed at first visual display means 46 (FIG. 1B) to allow the operator to visually check the same before entry into an appropriate storage unit upon depression of the Enter Key. Additionally, the contents (*dt*1, *dt*2, *dt*3, *dt*4 and *dtd*) of the derivative tach storage unit 38 are displayed at the visual display means 46 (FIG. 1B) through use of 18 AND gates 50 when the drvt signal is supplied to the AND gates. With this arrangement the amount to be entered into the storage unit 38 and, subsequently, the amount so entered may be displayed.

The derivative compensated process, or feedback, signal from the digital adder 30, together with a reference, or setpoint signal *sp* from a set point storage unit 52 are supplied to the digital subtractor 32 where the reference signals is subtracted from the modified feedback signal to yield an error, or deviation, signal E proportional to the difference therebetween. The set point storage unit 52 may comprise an array of magnetic cores of the same design as employed in other storage units, including the derivative storage unit 38. Resetting of the magnetic cores is effected by application of a reset signal thereto from AND gate 54 when the gate is supplied with simultaneous erase (era) or enter (ent) and set signals. Setting of the cores with the desired set point information is effected by application of A group, delayed enter (ent') and set signals applied through 18 AND gates 56, and display of the set point storage unit contents (*sp*1, *sp*2, *sp*3, *sp*4, and *spd*) at the visual display means 46 (FIG. 1B) is effected through 18 AND gates 58 each of which is supplied also with the set signal from the function counter and decoder 26.

Figure 4:
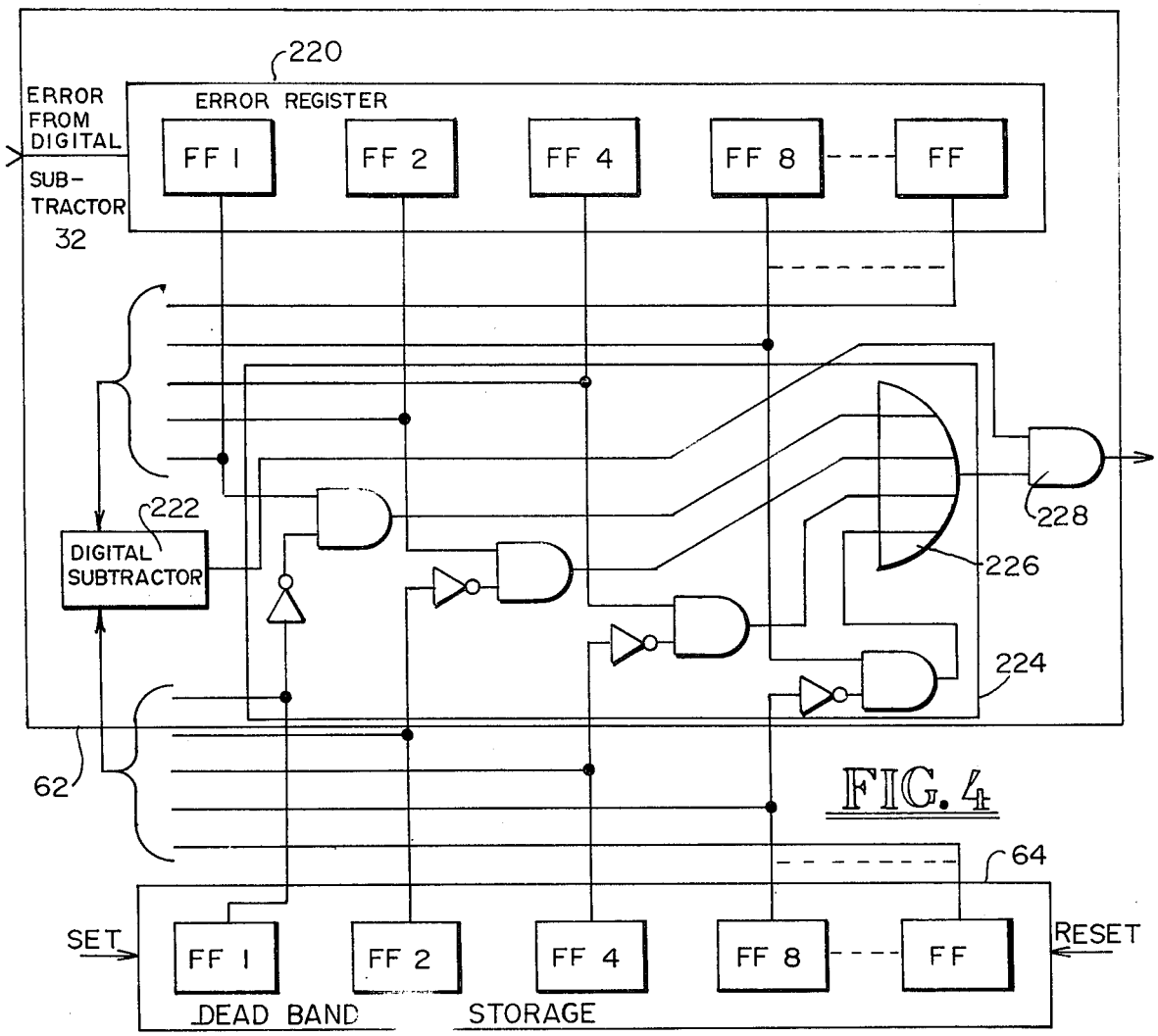

The error signal E from the digital subtractor 32 may be displayed at display unit 46 through 18 AND gates 60 upon application of a deviation (dev) signal thereto from the keyboard controlled function counter and decoder 26. The four BCD digits E1, E2, E3, E4 and decimal place information Ed also are supplied over 18 lines to a digital dead band comparator unit 62. As is well understood by those skilled in this art, if the Error signal falls within the dead band established by the comparators 62 the output from the comparators is zero (or some zero offset value, if desired). So long as the error signal E remains within the dead band, or zone, no change in the controller output is produced. The width of the dead band is established by the contents of the dead band storage unit 64 associated therewith. An exemplary dead band comparator which may be employed in the unit 62 is shown in FIG. 4 and described in detail herein below.

The dead band storage unit 64 may be of the same magnetic core type as derivative 38 and set point 52 storage units and requires no detailed explanation. The dead band storage unit memory units are set by application of A group, dead zone (dedz) and delayed enter (ent') signals thereto through AND gates 66, and are reset to zero by application of a reset signal applied thereto through AND gate 68 whose output is high whenever simultaneous erase or enter and dedz signals are applied thereto from the keyboard 24 and input counter and decoder 28. Also, display of the contents of the dead band storage unit 64 at numerical visual display means 46 is effected through use of a plurality of AND gates 70 when the AND gates are supplied also with the dedz signal input.

When the error signal E to the dead band comparator 62 exceeds the dead zone the output from the comparator responds to such error signal. The comparator output E is multiplied by a digital multiplier 72 having an output comprising the product of the error signal input E thereto and the magnitude of the signal supplied thereto from a proportional gain storage unit 74. As with the above-described derivative, set point and dead band storage units the proportional gain storage unit 74 may comprise an array of magnetic cores which may be reset by the output from an AND gate 76 when simultaneously supplied with erase (era) or enter (ent) and proportional gain (prgn) signals, which may be set by the outputs from AND gates 78 upon application of Group A, delayed enter (ent') and prgn signals to the input thereof, and the contents of which storage unit may be displayed at visual display means 46 through operation of AND gates 80 upon application of a prgn signal at the inputs thereof. The BCD proportional gain storage unit 74 output supplied over 18 lines to the digital multiplier 72 and AND gates 80 is identified $g1$, $g2$, $g3$, $g4$ and $gd$. Digital multipliers of the type employed are well known in the art and require no further description.

The digital multiplier 72 output Eg (comprising the derivative compensated error signal E multiplied by the stored proportional gain signal $g$) is supplied over 18 lines to 18 AND gates 82. In the automatic mode of controller operation a $\overline{ma}$ (not manual) signal is supplied to the AND gates to enable passage of the Eg signals therethrough. The $\overline{ma}$ signal is derived from a keyboard operated circuit described below.

In the automatic mode of operation of the exemplary controller, the multiplied error signal Eg is supplied to a digital adder 84 through integral compensation unit 86 and through OR gates 90 where the integral and proportional gain signals are added to provide a manipulated variable, or output signal $ot1$, $ot2$, $ot3$, $ot4$ and $otd$.

Integral, or lag, compensation as required is performed at the digitally operated integral compensation unit 86 by any well known process. For example, the process may include the summation of discrete values of $Eg_{t1}$, $Eg_{t2}$, ... $Eg_{tn}$. Considering a fixed $\Delta t$, established by a clock cl input thereto, the conventional low frequency Bode break is established by the value of $n$, beyond which the oldest values of $Eg_{tn+1}$, $Eg_{tn+2}$, ... are successively discarded as new values of Eg are added to the summation. Commercially available digital integrating means may be employed in this integrating process.

Figure 5:
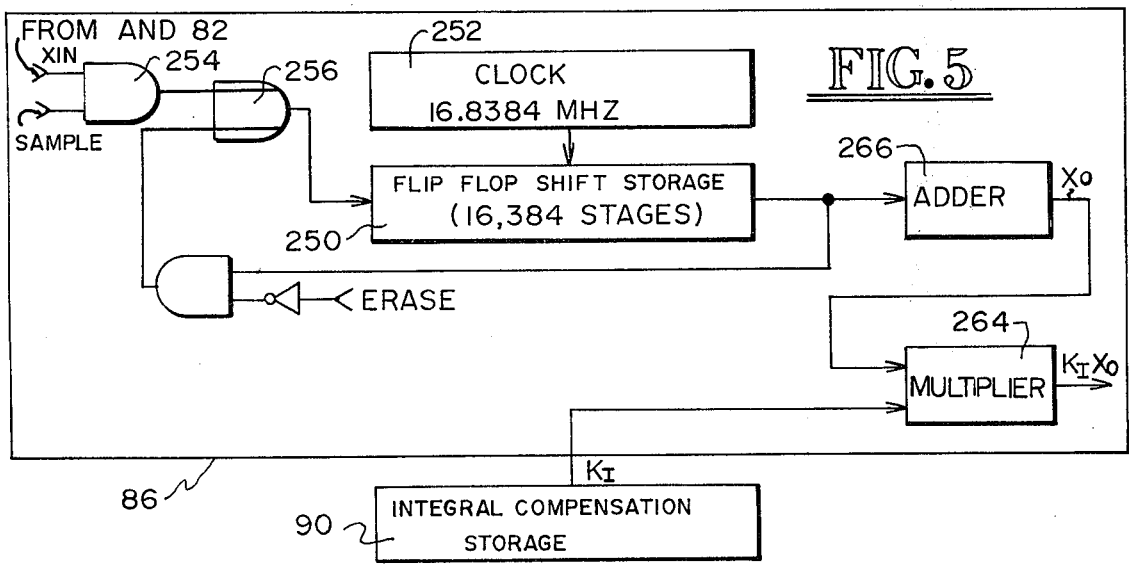

The integral constant for the integrating unit 86 is established by the contents of an integral compensation storage unit 90 connected thereto over 18 lines. As with above-described storage units, the unit 90 may comprise an array of magnetic cores which may be reset by a signal from AND gate 92 when supplied with simultaneous erase (era) or enter (ent) and integral (int) signals, which is set by application of A group, ent' and int signals to a plurality of AND gates 94 connected thereto, and the contents $in1$, $in2$, $in3$, $in4$ and $ind$ of which may be displayed at visual display means 46 through AND gates 96 when such gates are simultaneously supplied with the int signal. An exemplary digital integrating means which may be used in my novel controller is shown in FIG. 5 described below.

If desired, a derivative compensation unit, together with an associated derivative compensation storage unit, not shown, may be included between the AND gate 82 output and digital adder 84 input for derivative controller action. Such units may be of the same type and function in the same manner as the derivative (tach) units 34 and 38 described above, and require no additional description. They essentially would replace the function of the derivative tachometer units 34 and 38.

The proportional and integral control signals from the digital multiplier and integral compensation units, respectively, are added at digital adder 84 and the output $ot1$, $ot2$, $ot3$, $ot4$ and $otd$ from the adder is shown supplied through a digital to analog (D/A) converter 106 to a valve operator 108 for opening and closing operation of the valve 14 to automatically control the flow of fluid in pipe 10. Either an AC or DC reference is supplied to the D/A converter 106 for producing an AC or a DC analog output compatible with the requirements of the valve operator 108.

Alternatively, the controller output may be converted to pulses, as by use of a digital to pulse rate converter 110 having an output over two lines, one line indicating sense or direction, and the other line providing a pulse rate proportional to the magnitude of the signal supplied thereto from the digital adder 84, which output is suitable for driving a stepper motor, or the like. Also, display of the controller output at visual display means 46 is effected through AND gates 112 which are conditioned for passage of the output signals upon application of an output (out) signal to each of the gates, which output (out) signal is provided by the function counter and decoder 26 under control of the keyboard 24 (FIG. 1B).

The exemplary controller is conditioned for manual operation by removal of the $\overline{ma}$ signal from the input to the AND gate 82 disabling the same thereby preventing passage of the Eg signal from the digital multiplier to the adder 84. Simultaneously, a ma (manual mode) signal is supplied to an AND gate 114 (FIG. 1A) to enable the same for passage of signals from ±jog generator 116 to the digital adder 84 through the AND gate 114 and OR gate 90. The generator 116 output is increased positively by application of + jog signal at the input thereof together with an 8 or 9 signal thereto; the output changing at a slow rate with an 8 signal supplied thereto and at a faster rate with a 9 signal. A negative going output from the generator 116 is provided by application of a − jog signal thereto, together with an 8 or 9 signal for a slow or fast rate of change. The generator 116 may simply comprise an analog to digital converter supplied with an output from a motor driven potentiometer driven in one direction under control of a + jog signal, in the other direction under control of a − jog signal, and at a slow or fast rate under control of an 8 or 9 signal thereto. The source of the +jog, −jog, 8 and 9 signals is described hereinbelow with reference to FIG. 1B.

Figure 2:
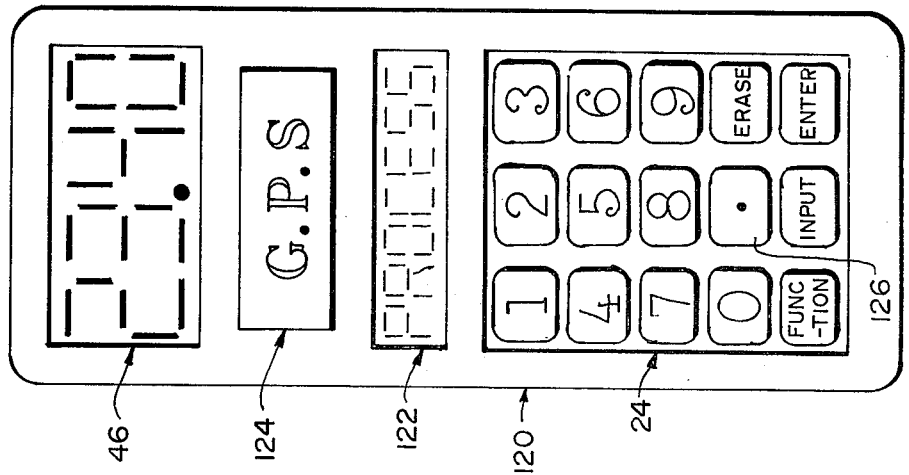
FIG. 2 is a front view of a controller showing the display means and keyboard.

Before continuing the description of the controller circuitry, the control and display panel 120 of the novel controller will be described with reference to FIG. 2. In the illustrated arrangement the panel 120, which may comprise the front of the controller, a separate console, or the like, is provided with the keyboard 24, the numerical visual display means 46, an alphabetic display means 122, and a fixed display means 124 which is lighted or unlighted depending upon certain operating conditions.

The keyboard 24 includes a set of decimal keys numbered 0 and 1–9 for successively entering the digits of a multiple digit number up to four digits, into the numerical register 42 (FIG. 1B) for subsequent transfer to one of the above-mentioned storage units. A decimal place key 126 is included for entry of decimal place information into register 44 for location of a decimal point before any one of the four digits entered by the decimal keys. Erase, function, input and enter keys are also included for generation of erase (era), function (fun), input (inp) and enter (ent) signals, some of which signals have been mentioned above with reference to the description of operation of the controller illustrated in FIG. 1A.

As mentioned above, AND gated signals from various circuit locations, including storage units, may be supplied to the numerical visual display means 46 to manifest the operating conditions at such locations. In addition, the display means 46 serves to visually manifest the decimal and decimal place information entered into the registers 42 and 44 through actuation of the decimal and decimal place keys.

The alphabetic display means 122 is used to manifest the source or type of digital information manifested by the numerical display means 46. For example, the word PROCESS is displayed, as illustrated in FIG. 2, when the process control, or feedback, signal from the process storage unit 20 is supplied to the numerical display means 46 through AND gate 21 upon enablement of the AND gate by a process (pro), high or low limit alarm signal (ha or la) from OR gate 23.

The fixed display means 124 manifests the process units of the variable being controlled. As noted above, controllers are used to control such process variables as flow, pressure, temperature, and the like. In the exemplary arrangement wherein the controller is used for flow control, the flow rate, in gallons per second G.P.S. is displayed. As seen in FIG. 1C, a process units display flip-flop 128 is used to energize and deenergize the display light 124, the light being energized and deenergized in the set and reset states, respectively, of the flip-flop. The flip-flop is set by application of a pro, set, dev, + jog, − jog, hi lim, lo lim or dedz signal thereto through an OR gate 130, and is reset by application of an out, prgn, drvt, or int signal thereto through OR gates 132 and 133. The flip-flop 128 also is set by an ent signal at the input to AND gate 131 in the absence of a signal from OR gate 132. Also, it is reset by a shift signal sh at the input to the OR gate 133. By illuminating the display during certain operations and not during other operations the operator can tell whether actual operating conditions or the contents of registers 42 and 44 are displayed at display means 46. Whenever a numerical key is depressed to enter information into register 42 a shift signal sh is produced to extinguish the process units display 124. This serves as a reminder to the operator that the entry key must be depressed to transfer information from the registers 42 and 44 to the selected storage. The AND gate 131 appropriately inhibits the ent pulse whenever the output from OR gate 132 is present, the process units display 124 being extinguished whenever out, prgn, drvt, or int signals are present.

Controllers often are provided with an alarm and/or corrective action circuitry for operation when certain operating limits are exceeded. With some arrangements, for example, an alarm may be operated if the error, or deviation, signal E from the subtractor circuit exceeds a predetermined value. In addition, or alternatively, an alarm and/or corrective action may be taken if the process signal exceeds a predetermined maximum and/or falls below a predetermined minimum value.

In the exemplary arrangement high and low limit alarm functions are provided when the flow rate exceeds or drops below preset maximum and minimum values, respectively. As seen in FIG. 1C high and low limit storage units 134 and 136 are shown for storing the predetermined maximum and minimum values of flow at which the alarm will function. As with other storage units described above, the units preferably are of the nonvolatile type, such as magnetic core arrays, which cores are reset by simultaneous application of era (erase) or ent (enter) and hilim (high limit) or lolim (low limit) signals to the respective AND gates 138 and 140. Simultaneous application of Group A, ent' and hilim, or Group A, ent' and lolim signals to AND gates 142 and 144, respectively, sets the storage units with the desired high and low limit values. These limits may be displayed at numerical display unit 46 (FIG. 1B) through use of AND gates 146 and 148 upon application of hilim and lolim signals, respectively, to the gates.

High and low limit comparators 150 and 152 compare the preset high and low limit values from the storage units with the process signal pr from the process unit 20 (FIG. 1A) and if the preset values are exceeded, in the high or low direction, output signals ha and la, respectively, are produced at the comparator outputs. The process signal is displayed through AND gates 21 now enabled by an ha or la signal supplied thereto through OR gate 23. The ha and la signals also are supplied to an alarm display encoder 154 through OR gate 155. The encoder 154 has an output when energized, identified as the F group which is supplied to the alphabetic visual display unit 122 to spell out the word ALARM. Signals from the F group are shown supplied to five of the letter displays of the display unit 122 for production of the required five letters ALARM. It will be apparent that the alarm signals ha and la also could be used to energize an audible or other such alarm means. Also, these signals could be employed in the controller to initiate corrective action such as shutting down operation, momentarily decreasing or increasing the output signal OT in an effort to reduce or increase flow, respectively, to avoid the alarm condition, or the like.

Information for all of the above-mentioned storage means (with the exception of the process storage unit 20 which receives its input information from the A/D converter 18) is supplied by the operator through use of the manually operated keyboard 24. Referring to FIG. 1B the keys may comprise push-button switches supplied with power from a bus, not shown. The digit key outputs 0–9 are connected to encoder means 156 comprising a plurality of decimal to binary coded decimal encoders for uniquely encoding the decimal digits. The encoder outputs, each over 4 lines, are supplied through OR gate 158 and delay unit 160 to the set terminal of the No. 1 place numerical register 42-1 of the temporary storage means 42. The storage means 42 includes four registers 42-1, 42-2, 42-3 and 42-4, each of which may comprise four flip-flops. The four flip-flops of the No. 1 place register are individually set by the four lines from the delay unit 160. A delayed enter signal ent'' from the enter key through delay means 161 is supplied as a clear pulse to all of the registers 42 to clear the same.

All of the decimal keys are connected to an OR gate 162 for production of a shift signal sh at the OR gate output every time a decimal key is depressed. The shift signal is supplied to each of the registers of storage means 42 to shift the contents of the next highest register. The contents of the No. 4 place register 42-4 is simply emptied, or erased. The shift signal reaches the registers before the delayed set signals reach the No. 1 place register 42-1 whereby the register contents are shifted before the BCD information from the encoder means 156 reaches the No. 1 place register.

Decimal place information is entered into temporary storage means 44 by the dec (decimal) key 126. The storage means 44 may simply comprise four registers 44-1, 2, 3 and 4, each of which comprises a signal flip-flop. The delayed enter signal ent'' from the delay unit 161 is supplied to all of the registers as a clear signal to clear the same, the registers 44-2, 44-3 and 44-4 being supplied with the ent'' signal through OR gates 164-2, 164-3 and 164-4, respectively. A dec (decimal) signal from the decimal place key functions to set the No. 1 place flip-flop 44-1 and to clear the No. 2, No. 3, and No. 4 place flip-flops by connection through the OR gates 164-2, 164-3 and 164-4. The shift signal sh is supplied to all of the registers 44-1, 44-2, 44-3 and 44-4 to shift the contents to the next higher register, and the last place register being emptied.

The numerical and decimal place information contained in the registers of storage means 42 and 44 is visually manifested at the visual display means 46. The BCD information from the numerical registers is encoded for use by the display elements, such as light emitting diodes, or the like. The numerical information is supplied to the display means 46 through OR gates 166-1, 2, 3 and 4 (each of which blocks represents four OR gates for the four BCD lines) whereas the decimal place information is supplied thereto through OR gates 168-1, 168-2, 168-3 and 168-4. The same numerical information at terminals No. 1P, No. 2P, No. 3P and No. 4P, and decimal place information at terminals No. 1 dec, No. 2 dec, No. 3 dec and No. 4 dec, collectively identified as the A group of signals, is supplied to the AND gates which supply set signals to the derivative (tach), setpoint, deadband, proportional gain, integral, high and low limit storage units described above for storing the information when the selected AND gate is enabled.

The OR gates 166-1, 2, 3 and 4 also may be supplied with AND gated group G, H, I and J signals from AND gates at various controller circuit locations, including the above-mentioned storage units. In particular, AND gated $g1$, $g2$, $g3$ and $g4$ (proportional gain), $in1$, $in2$, $in3$ and $in4$ (integral), $hi1$, $hi2$, $hi3$ and $hi4$ (high limit), $lo1$, $lo2$, $lo3$ and $lo4$ (low limit), $dz1$, $dz2$, $dz3$ and $dz4$ (dead zone), $dt1$, $dt2$, $dt3$ and $dt4$ (derivative tachometer), $pr1$, $pr2$, $pr3$ and $pr4$ (process), $sp1$, $sp2$, $sp3$ and $sp4$ (set point), $e1$, $e2$, $e3$ and $e4$ (error) and, $ot1$, $ot2$, $ot3$ and $ot4$ (output) signals may be supplied to the visual display means 46 through the OR gates 166-1, 166-2, 166-3 and 166-4, respectively, for visual display thereof.

The decimal place information for these numerals is applied through one of the OR gates 168-1, 2, 3 or 4 for location of the decimal point before any one of the numerals. No decimal point display indicates that the decimal point is located after the 4th place digit. Decimal place information for the de1, de2, de3 and de4 input termals of the OR gates 168-1, 2, 3 and 4, respectively, is obtained from a four position decimal place decoder 170 (FIG. 1C) having an output at one of the four output lines depending upon the binary coded information at the input thereto. The input to the decoder 170 is obtained from two OR gates 15 to which the AND gated $gd$, $ind$, $hid$, $lod$, $dzd$, $dtd$, $prd$, $spd$, $ed$ and $otd$ binary coded decimal place signals are supplied.

Manual operation of the controller, wherein the controller output is under direct control of the operator, is established by placing the Manual-Auto flip-flop 172 (FIG. 1B) in the set condition. This is accomplished by successively depressing the Function key to provide a series of input pulses to the Function Counter and decoder 26, to advance the same to the out (output) state. It will here be noted that the counter 26, and the counter 28, have only one output over one of the output lines, which output is advanced in sequence as sequential input pulses are supplied at the count input terminals. The Function counter and decoder 26 is advanced to the $\overline{out}$ No. 5 state upon receipt of an inp (input) pulse from the Input key. Similarly the Input counter and decoder 28, is advanced to the blank No. 10 state upon receipt of a fun (function) pulse from the Function key.

With the Function counter and decoder 26 in the "out" state, the decimal key 126 is depressed for application of a set signal to the flip-flop 172 through the now enabled AND gate 174. In the set condition the ma output of flip-flop 172 is supplied over line 176 to the input counter and decoder 28 to advance the same one step from the No. 10 (blank) state to the +jog state. The ma signal also is supplied to AND gate 114 (FIG. 1A) to enable passage of the output from the jog generator 116 there-through. Simultaneously the $\overline{ma}$ output from the ma flip-flop 172 goes low to disable operation of the AND gate 82 to prevent the multiplied error signal Eg from reaching the digital adder 84 either directly or through the integral compensation unit. Consequently, only the job generator 116 supplies the output signal from the controller in the manual mode.

The jog generator 116 produces an output signal only when simultaneous +jog (or −jog) and 8 (or 9) signals are supplied as inputs thereto. In the manual operating mode small and large signals, for slow and fast jog, are provided upon depression of the 8 and 9 keys, respectively. The −jog condition, for control in the opposite direction, is entered from the +jog condition by actuation of the input key to advance the input counter and decoder 28 from the +jog to the −jog state. The flip-flop 172 is reset by advancing the function counter and decoder 26 to the $\overline{out}$ state as by depressing the input key, and then depressing the erase key, whereupon a reset signal is supplied to the flip-flop 172 through AND gate 178.

The function counter and decoder 26 outputs are supplied to encoders 180-1, 2, 3 and 4 (FIG. 1C) where the pro, set, dev, and out signals are encoded and fed through OR gates 184 to the visual display means 122 for visual display of the words PROCESS, SETPOINT, DEVIAT, and OUTPUT, respectively, during the presence of such signals. Similarly, the + jog, − jog, prgn, drvt, int, hilim, lolim, and dedz signals from the input counter and decoder are supplied to encoders 182-1 through 8 having outputs which also are fed through the OR gates 184 to the visual display means 122 for visual display of the words +JOG, −JOG, PROPGAIN, DERIVAT, INTEGRAL, HIGHLIM, LOWLIM, and DEADZONE, respectively.

Figure 3:
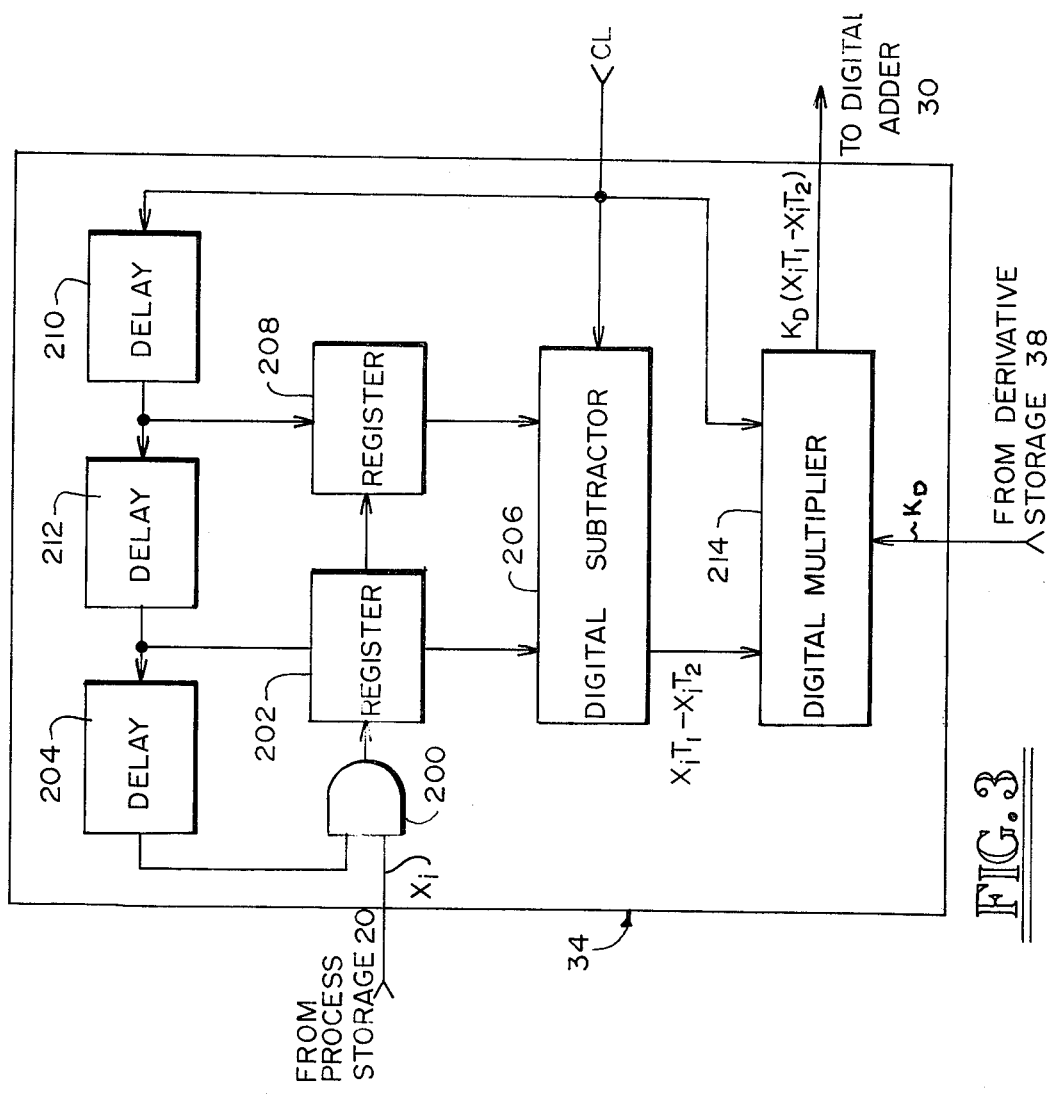
FIGS. 3, 4 and 5 are block diagram illustrations of exemplary derivative compensation, dead band comparator, and integral compensation units, respectively, which may be utilized in the controller shown in FIGS. 1A, 1B and 1C.

A block diagram of a derivative compensation circuit 34 of the type which may be included in the controller of this invention is shown in FIG. 3 to which reference now is made. The process signal from storage 20 is shown supplied through an AND gate 200 to a first register 202 under control of a delayed clock pulse from delay unit 204. A clock pulse at the input of the digital subtractor 206 initiates subtraction of the contents of register 202 from register 208. The delayed pulse from delay unit 210 erases the contents of register 208, the further delayed pulse from delay unit 212 shifts the contents of register 202 to the now empty register 208, and the still further delayed pulse from delay unit 204 gates the input signal to the now empty register 202. The output from the digital subtractor unit 206 provides a measure of the difference between succeeding input signals from the process storage unit 20. This signal is supplied to digital multiplier 214 where it is multiplied by the contents of the derivative storage unit 38 comprising the derivative constant.

Reference is made to FIG. 4 wherein details are shown of a comparator which may be included in the dead band comparator 62. The digital error signal from the subtractor 32 is supplied to an error register 220, and outputs from the register 220 and dead band storage 64 are supplied to both a digital subtractor 222 and to a comparator logic unit 224. The logic unit includes a plurality of AND gates having inputs supplied directly from the error register stages, and through inverter amplifiers from the dead band storage stages. The AND gate outputs are applied to an OR gate 226. Outputs from the digital subtractor 222 and from the OR gate 226 of the comparator logic are supplied to AND gates 228 which provide an output from the dead band comparator to the digital multiplier 72. The difference signal between the dead band storage 64 and error register 220 from the digital subtractor appears at the output from the AND gates 228 when the comparator logic unit 224 indicates that the error signal exceeds the value stored in the dead band storage unit 64.

Integral compensation, such as provided by unit 86 shown in FIG. 1A, calls for an output $X_0$ to be a function of the input $X_i$ according to the equation:

$$X_0 = R_I \int x_i dt \tag{1}$$

where $K_I$ = Integral Gain constant.

The integration process can be defined by a mathematical series as follows:

$$X_0 = X_{i1} \Delta t_1 + X_{i2} \Delta t_2 + \ldots X_{in} \Delta t_n \tag{2}$$

$$n \to \infty$$

$$\Delta t_n \to 0$$

The integral compensation break frequency is approximately established by a total time over which the series is taken. For example if $\Delta t_n = 0.1$ seconds and the total number, $n$, of the terms of the series summed equals $16,384 = 2^{14}$, then:

Total time = 16,384 terms x.1 seconds per term = 27.3 minutes, and, the
approximate Break frequency $$(hz) = \frac{1}{2\pi T} = \frac{1}{2\pi 27.3 \times 60} = 97.2 \times 10^{-6} hz$$

A conventional Analog 3 mode process controller would typically have a reset range of 0.1 to 50 repeats per minute which is equal to a time constant adjust of 10 to 0.02 minutes, respectively. As noted above, if a 0.1 second $\Delta t$ were employed with 16,384 terms a built in time constant of approximately 27.3 minutes would be generated. Therefore an adjustable 10 to 0.02 minutes time constant can be implemented by controlling the value of $K_I$ from $1/(10\times60)$ to $1/(.02\times60)$.

A circuit which may be employed for implementing the integral compensation is shown in FIG. 5. There, the integral compensation unit 86 is shown comprising a circulating storage 250 containing, for example, 16,384 places and using a circulate time of 0.01 seconds. The clock 252 frequency would equal:

$$f(\text{clock}) = \frac{168384}{.01 \text{ sec}} = 16.8384 \text{ mhz}$$

A sample pulse at the input to AND gate 254 would be generated every 0.01 seconds + $10^{-6}$ secs./16.8384.

This sample pulse, supplied to the shift storage 250 through the AND gate 254 and an OR gate 256, would fill the circulating shift storage with sampled $X_{in}$ in 27.3 minutes. Thereafter, each .01 seconds all of the stored data, 16,384 terms, would pass by the adder 266 which would sum all 16,384 terms.

This sum would represent the series of equation (2). The timing is such that the newest piece of data $X_{in}$ is stored adjacent to the next to the newest piece of data $X_i$ $(n-1)$. The erase pulse would be generated every 0.01 seconds + $10^{-6}$ secs./16.8384, but would be advanced in time one clock pulse period $10^{-6}$ secs./16.834. This timing of the erase pulse would cause it to eliminate the oldest piece of data and make room for the newest piece of data. The sum of all 16,384 terms is multiplied at multiplier 264 by the integral gain constant $K_I$ contained in storage 90, and the output from the multiplier comprises the output from the integral compensation unit 86.

It will be apparent that the invention is not limited to use with the specific derivative compensation, dead band comparator and integral compensation units shown in FIGS. 3, 4 and 5, respectively, and described above, since other such units may be employed.

Although the operation of the novel controller is believed to be apparent a brief description thereof will now be made. After the controller is first turned on, the function key would be successively depressed until function counter and decoder 26 was placed in the 2 state which generates the set signal. Unless special provision is made, which is not shown, the set point storage 52 (and other storage units) may contain any number. The setpoint information in storage unit 52 is visually displayed at numerical display means 46 through operation of AND gates 58 which are supplied with the set signal. The word SETPOINT simultaneously is displayed at display means 122 through application of the set signal to the encoder 180-2. The set signal also is routed via OR gate 130, to the flip-flop 128 to set the same thereby energizing the process units display light 124 to display the process units which, in the illustrated arrangement are G.P.S. for gallons per second.

If the storage unit 52 does not contain the desired set point, or reference, information the function counter and decoder 26 may be stepped by successive operation of the function key to the No. 2, (set), state for removal of the G, H, I, and J group inputs, and decimal place information from decoder 170, to the display means 46. The desired set point information then is entered into the temporary storage means (registers 42 and 44) for subsequent transfer to the storage unit 52. Assume, for example, that a set point value of 23.95 gallons per second is desired. The number 2 key is depressed for generation of a shift pulse, $sh$, through OR gate 162 which shifts the contents of the registers 42 and 44 to the next higher place. The 2 key signal also is encoded by encoder 156 and routed through OR gate 158 and delay unit 160 to the No. 1 place numerical register 42-1. The 2 entry is displayed at the No. 1 place of the numerical display LED of display unit 46.

Next, the 3 key is depressed whereupon the sh signal shifts the 2 entry from register 42-1 to 42-2, and the encoded and delayed 3 key signal is applied to the No. 1 place register 42-1. The 3 entry now is displayed at the No. 1 place numerical display LED and the 2 entry is displayed at the No. 2 place.

The decimal point key 126 is then depressed to set the No. 1 place decimal point register 44-1 and to clear the other registers 44-2, 44-3 and 44-4. The decimal point is thereby displayed at the No. 1 decimal place of display means 46, behind the previously entered 3. The digits 2 and 3 are not shifted with entry of the decimal point since no shift pulse is generated by depression of the decimal place key. Next the 9 key is depressed generating the sh pulse which shifts the previously entered 23. Information one place to the right into the registers 42-3, 42-2 and 44-2 registers, respectively. Finally, the 5 key is depressed and the above-described sequence of first shifting the information in the registers 42 and 44 then entering the 5 information in the register 42-1 takes place. The number 23.95 is thereby visually manifested at display means 46.

If the operator is satisfied that the indicated set point is correct, or that which is desired, the function key is successively depressed for a (set) output signal from function counter and decoder 26. The Enter key then is depressed to erase the set point storage 52 and enter the new value therein. When the Enter key is depressed an erase or enter signal (era + ent) from OR gate 190 (FIG. 1B) is applied through AND gate 54 to clear the storage unit 52 (FIG. 1A). A delayed enter signal, ent', from delay unit 192 (FIG. 1B) is supplied to AND gates 56 (FIG. 1A) for entry of the selected value into the cleared set point storage unit 52. The A group signals, i.e. those from registers 42 and 44, are thereby entered into the set point storage unit through the now enabled AND gates 56. Although the contents of storage unit 52 are erased before the new value is entered, the duration of the erased time is small so that the inertia of any practical process under control would prevent any significant response. The registers 42 and 44 containing the set point information now entered into set point storage are cleared by the delayed ent'' signal from delay 161; the delay unit 161 providing for a longer delay of the ent signal than the delay unit 192. The process units display 124 which was extinguished upon receipt of the first shift signal sh is again energized upon receipt of an ent signal to the flip-flop 128 through gates 131 and 130.

With the registers 42 and 44 cleared, the process, deviation and output variables also may be displayed by stepping the function counter and decoder 26 by successive actuation of the function key. As noted above, these variables are determined by the actual closed-loop system, and are not entered as fixed parameters into storage. As the function key is successively actuated the process variable, setpoint signal, deviation variable, output variable and no output (blank) are displayed; the process, deviation and output variables being fed through the AND gates 21, 60, and 112, respectively, as the gates are enabled by the pro, dev, and out signals from the function counter and decoder 26.

The contents of other storage units are displayed by successive actuation of the input key thereby stepping the input counter and decoder 28 to provide successive output signals therefrom. By this means the proportional gain, derivative compensation, integral compensation, high limit, low limit and deadzone compensation parameters contained in storage are displayed. Also, information is entered into the storage units which are under control of the input counter and decoder 28 by operation of the keyboard in the manner described above. Alternatively, the storage units may be cleared first before entering the desired information into the registers 42 and 44. For example, if the proportional gain storage is to be set, the input key is successively depressed to call up the No. 3, prgn, signal from the input counter and decoder. If the displayed proportional gain is not that which is desired, the erase key may be depressed to reset the storage unit 74, and the desired proportional gain may then be entered into registers 42 and 44 through successive operation of the required decimal and decimal place keys. The register contents then are transferred to the proportional gain storage 74 and the registers cleared by actuation of the Enter key.

The invention having been described in detail in accordance with the requirements of the Patent Statutes, various changes and modifications will suggest themselves to those skilled in this art, which changes and modifications fall within the spirit and scope of the invention as defined in the appended claims.

I claim:

1. In a digital process controller having feedback means for producing a process signal representative of a process variable to be controlled, a reference signal, means responsive to said process and reference signals for deriving an error signal in response to the difference therebetween, controlling circuit means including multiplier means and having an output signal responsive to said error signal for control of the process variable, the improvement comprising:

a console fixed circuit parameter multiple-bit erasable storage means at the console for storing controlling circuit parameters including a proportional gain signal to establish the amount by which said error signal is multiplied by said multiplier means, a keyboard with key members actuatable by an operator, multiple-bit temporary storage means at the console responsive to actuation of key members for temporarily storing signals for establishing the fixed circuit parameters including the proportional gain signal, means under control of said keyboard for transferring information which includes said proportional gain signal from said temporary storage means to said fixed circuit parameter storage means, visual display means at the console for viewing by the operator, means for simultaneously displaying at said visual display means the identity and measure of signals stored in said temporary storage means, including said proportional gain signal, for checking by the operator prior to transferring information from said temporary storage means to said fixed circuit parameter storage means.

2. In a process controller as defined in claim 1 wherein said fixed parameter storage means includes:

means for storing said reference signal transferred thereto under control of said keyboard from said temporary storage means.

3. In a process controller as defined in claim 1 including:

means for simultaneously displaying at said visual display means both the identity and measure of keyboard selected controller fixed and variable circuit parameters.

4. In a process controller as defined in claim 1 in which the controller output signal for control of the process variable is proportional to the time integral of the error signal, and the rate of change of the error signal, means under control of said keyboard for also displaying at said visual display means integral and derivative constants of said controlling circuit means.

5. In a process controller as defined in claim 3 wherein said error signal comprises a variable circuit parameter which is displayable at said visual display means.

6. In a process controller as defined in claim 3 wherein said output signal from said controlling circuit means comprises a variable circuit parameter which is displayable at said visual display means.

7. In a process controller as defined in claim 3 wherein said process signal from said feedback means comprises a variable circuit parameter which is displayable at said visual display means.

8. In a digital process controller having feedback means for producing a process signal representative of a process variable to be controlled, a reference signal, means responsive to said process and reference signals for deriving an error signal in response to the difference therebetween, controlling circuit means having an output signal responsive to said error signal for control of the process variable, the improvement comprising:

a console fixed circuit parameter multiple-bit erasable storage means at the console for storing controlling circuit parameters, a keyboard with key members actuatable by an operator, multiple-bit temporary storage means at the console responsive to actuation of key members for temporarily storing signals for establishing the fixed circuit parameters, means under control of said keyboard for transferring information from said temporary storage means to said fixed circuit parameter storage means, visual display means at the console for viewing by the operator, means for simultaneously displaying at said visual display means the identity and measure of signals stored in said temporary storage means for checking by the operator prior to transferring information from said temporary storage means to said fixed circuit parameter storage means, a differentiating circuit responsive to said process signal and having an output which is added to said process signal, said differentiating circuit including means for storing in said fixed parameter storage means a signal representative of the derivative rate time of the differentiating circuit, said derivative rate time signal being entered into said fixed parameter storage means through transfer from said temporary storage means under control of said keyboard.

9. In a digital process controller having feedback means for producing a process signal representative of a process variable to be controlled, a reference signal, means responsive to said process and reference signals for deriving an error signal in response to the difference therebetween, controlling circuit means having an output signal responsive to said error signal for control of the process variable, the improvement comprising:

a console fixed circuit parameter multiple-bit erasable storage means at the console for storing controlling circuit parameters, a keyboard with key members actuatable by an operator, multiple-bit temporary storage means at the console responsive to actuation of key members for temporarily storing signals for establishing the fixed circuit parameters, means under control of said keyboard for transferring information from said temporary storage means to said fixed circuit parameter storage means, visual display means at the console for viewing by the operator, means for simultaneously displaying at said visual display means the identity and measure of signals stored in said temporary storage means for checking by the operator prior to transferring information from said temporary storage means to said fixed circuit parameter storage means, said controlling circuit means including dead band comparator means having as an input the error signal, said fixed circuit parameter storage means being associated with said dead band comparator for storing a signal establishing the band of error signals over which no change is produced in the output from said dead band comparator.

10. In a digital process controller having feedback means for producing a process signal representative of a process variable to be controlled, a reference signal, means responsive to said process and reference signals for deriving an error signal in response to the difference therebetween, controlling circuit means having an output signal responsive to said error signal for control of the process variable, the improvement comprising:
 a console
 fixed circuit parameter multiple-bit erasable storage means at the console for storing controlling circuit parameters,
 a keyboard with key members actuatable by an operator,
 multiple-bit temporary storage means at the console responsive to actuation of key members for temporarily storing signals for establishing the fixed circuit parameters,
 means under control of said keyboard for transferring information from said temporary storage means to said fixed circuit parameter storage means,
 visual display means at the console for viewing by the operator,
 means for simultaneously displaying at said visual display means the identity and measure of signals stored in said temporary storage means for checking by the operator prior to transferring information from said temporary storage means to said fixed circuit parameter storage means,
 said controlling circuit means including a multiplier to which said error signal is supplied,
 said fixed circuit parameter storage means being asociated with said multiplier for storing a signal establishing the amount by which said error signal is multiplied by said multiplier.

11. In a digital process controller as defined in claim 10 wherein said controlling circuit means includes an integrating circuit responsive to the error signal,
 said fixed circuit parameter storage means being associated with said integrating circuit for storing a signal which establishes the integral rate constant of the integrating circuit.

12. In a digital process controller as defined in claim 11 including a differentiating circuit responsive to said process signal and having an output which is added to said process signal, said differentiating circuit including means for storing in said fixed parameter storage means a signal representative of the derivative rate time of the differentiating circuit,
 said derivative rate time signal being entered into said fixed parameter storage means through transfer from said temporary storage means under control of said keyboard.

13. In a digital process controller as defined in claim 11 wherein said controlling circuit means includes dead band comparator means having as an input the error signal,
 said fixed circuit parameter storage means being associated with said dead band comparator for storing a signal establishing the band of error signals over which no change is produced in the output from said dead band comparator.

14. In a digital process controller having feedback means for producing a process signal representative of a process variable to be controlled, a reference signal, means responsive to said process and reference signals for deriving an error signal in response to the difference therebetween, controlling circuit means having an output signal responsive to said error signal for control of the process variable, the improvement comprising:
 a console
 fixed circuit parameter multiple-bit erasable storage means at the console for storing controlling circuit parameters,
 a keyboard with key members actuatable by an operator,
 multiple-bit temporary storage means at the console responsive to actuation of key members for temporarily storing signals for establishing the fixed circuit parameters,
 means under control of said keyboard for transferring information from said temporary storage means to said fixed circuit parameter storage means,
 visual display means at the console for viewing by the operator,
 means for simultaneously displaying at said visual display means the identity and measure of signals stored in said temporary storage means for checking by the operator prior to transferring information from said temporary storage means to said fixed circuit parameter storage means,
 said controlling circuit means including an integrating circuit responsive to the error signal,
 said fixed circuit parameter storage means being associated with said integrating circuit for storing a signal which establishes the integral rate constant of the integrating circuit.

15. In a digital process controller having feedback means for producing a process signal representative of a process variable to be controlled, a reference signal, means responsive to said process and reference signals for deriving an error signal in response to the difference therebetween, controlling circuit means having an output signal responsive to said error signal for control of the process variable, the improvement comprising:
 a console
 fixed circuit parameter multiple-bit erasable storage means at the console for storing controlling circuit parameters,
 a keyboard with key members actuatable by an operator,
 multiple-bit temporary storage means at the console responsive to actuation of key members for temporarily storing signals for establishing the fixed circuit parameters,
 means under control of said keyboard for transferring information from said temporary storage means to said fixed circuit parameter storage means,
 visual display means at the console for viewing by the operator,
 means for simultaneously displaying at said visual display means the identity and measure of signals stored in said temporary storage means for checking by the operator prior to transferring information from said temporary storage means to said fixed circuit parameter storage means,
 a ± jog generator,
 means under control of said keyboard for disconnecting the output signal from the controlling circuit means from the controlled process variable and for connecting the output from the ± jog generator to said controlled process variable for control thereof by the generator output, and means for simultaneously displaying at said visual display means the output from said ± jog generator and identity thereof during control of the process variable by said ± jog generator output.

16. In the process controller as defined in claim 15 including:

means under control of said keyboard for control of the direction and rate of change of the process variable by said ± jog generator.

17. A method of programming a controller of the type having feedback means for producing a process signal related to a measure of the process, fixed circuit parameter storage means for storing a set point signal, difference means responsive to said process and set point signals and providing an error signal in response to the difference therebetween, proportional and time integral controller action means responsive to said error signal and having an output used for control of a process variable, said method comprising:

generating a digital set point signal by means of an operator controlled keyboard, storing said setpoint signal in a temporary storage means, simultaneously visually displaying at visual display means under keyboard control both the identity and magnitude of the set point signal held in said temporary storage means for visual examination thereof by the operator before entry into said fixed circuit parameter storage means, transferring the set point signal from the temporary storage means to said fixed parameter storage means, and repeating the above recited generating, storing, displaying and transferring steps for entering proportional and integral time constant signals into said fixed parameter storage means for controlling the gain and time integral of said proportional and time integral controller action means.

18. A three-mode process controller comprising:

feedback means for producing a process signal representative of a process variable to be controlled, a reference signal source, means responsive to said process aand reference signals for providing an error signal in response to differences therebetween, controlling circuit means having an output signal responsive to said error signal for control of the process variable, said controlling circuit including a plurality of storage means for storing different fixed controlling circuit parameters, including gain, integral and derivative time constant signals, a manually operated keyboard, means under control of said keyboard for selecting a storage means to which information may be transferred, temporary storage under control of said keyboard for temporarily storing signals including gain, integral and derivative time constant signals for subsequent transfer to one of said storage means, first visual display means connected to said temporary storage for display of the contents thereof, second visual display means under control of said keyboard for identifying a keyboard selected storage means, means under control of said keyboard for transferring information from said temporary storage to the keyboard selected storage means.

19. The process controller as defined in claim 18 including:

means under control of said keyboard for displaying the contents of a keyboard selected storage means at said first visual display means.

20. In a process controller having feedback means for producing a process signal representative of a process variable to be controlled, a reference signal, means responsive to said reference and process signals for deriving an error signal in response to the difference therebetween, controlling circuit means having an output signal responsive to said error signal for control of the process variable, the improvement comprising:

a console, operator actuatable switching means, signal energized visual alphabetical and numerical display means at the console for the simultaneous display of the identity and measure of process controller signals, and means under control of said switching means for changing the source of signals supplied to said visual display means for the display of any one of a plurality of process controller parameters, said operator actuatable switching means including at least one key of an operator controlled keyboard by means of which inputs to the visual display means are cycled upon repeated actuation thereof for operator selection of the parameters to be displayed.

21. In a process controller as defined in claim 20 wherein said controller is of the digital type having digital type fixed circuit parameter storage means for storing controller circuit parameters, said operator actuatable switching means comprising a keyboard at the console having a plurality of key members for generating digital signals, and means under control of said key members for changing controlling circuit parameters.

22. In a process controller as defined in claim 20 wherein said plurality of displayable process controller signals include process, set point, deviation and output signals.

23. In a process controller as defined in claim 20 wherein said plurality of displayable process controller signals include signals indicative of the controller circuit parameters of proportional gain, integral rate and derivative time constant.

24. In a process controller as defined in claim 20 wherein said process controller signals displayable at said visual display means include said process, error and output signals.

25. In a process controller as defined in claim 20 wherein said process controller includes proportional, integral and derivative controller circuit means for proportional, integral and derivative controller circuit actions, digital storage means for storing process control parameters including gain, integral and derivative time constant signals for controlling gain, time integral and time derivative for the controller circuit actions, said process controller signals displayable at said visual display means including said gain, integral and derivative time constant signals.

26. In a process controller having proportional controller circuit means for at least proportional controller circuit action, digital storage means for storing process control parameters including a gain control signal for controlling the gain for the proportional controller circuit action, an operator actuable keyboard having a plurality of alphabetic and numeric keys for entering process control parameters, including a gain control signal, into said digital storage means, signal energized alphabetic and numeric visual display means, means under control of said keyboard for selective display at said visual display means of the identity and value of keyboard selected process control parameters including said gain control signal entered into said digital storage means.

27. In a process controller as defined in claim 26 in which the controller circuit means includes means for integral controller action, means including said digital storage means for storing an integral time constant signal for controlling the time integral for the integral controller action, means including said keyboard for entering a selected integral time constant signal into said digital storage means, and wherein said means under control of said keyboard for selective display at said visual display means of the identity and value of keyboard selected process control parameters includes means for display of the identity and value of said integral time constant signal entered into said digital storage means.

28. In a process controller as defined in claim 26 including controller circuit means for derivative controller action, means including said digital storage means for storing a derivative time constant signal for controlling the time derivative for the derivative controller action, means including said keyboard for entering a selected derivative time constant signal into said digital storage means, and wherein said means under control of said keyboard for selective display at said visual display means of the identity and value of keyboard selected process control parameters includes means for display of the identity and value of said derivative time constant signal entered into said digital storage means.

29. In a process controller as defined in claim 28 including controller circuit means for integral controller action, means including said digital storage means for storing an integral time constant signal for controlling the time integral for the integral controller action, means including said keyboard for entering a selected integral time constant signal into said digital storage means, and wherein said means under control of said keyboard for selective display at said visual display means of the identity and value of keyboard selected process control parameters includes means for display of the identity anf value of said integral time constant signal entered into said digital storage means.

30. In a three-mode process controller having proportional, integral, and derivative controller circuit means for proportional, integral and derivative controller circuit actions, digital storage means for storing process control parameters including gain, integral and derivative time constant signals for controlling the gain, time integral and time derivative for the controller circuit actions, an operator actuable keyboard having a plurality of alphabetic and numeric keys for entering selected gain, integral and derivative time constant signals into said digital storage means, signal energized alphabetical and numerical visual display means under control of said keyboard for selective display of the identity and value respectively of keyboard selected process control parameters including said gain, integral and derivative time constant signals entered into said digital storage means.

31. In a three-mode process controller as defined in claim 30 wherein said controller includes feedback means for producing a process signal representative of a process variable to be controlled, a reference signal, means responsive to said reference and process signals for deriving an error signal in response to the difference therebetween and means responsive to said error signal for providing a controller output signal for control of the process variable, said alphabetical and numerical display means including means under control of said keyboard for selective display of the identity and value of process variables including said process, reference, error and controller output signals.

* * * * *